(12) United States Patent
Mitadera et al.

(10) Patent No.: US 8,171,705 B2
(45) Date of Patent: May 8, 2012

(54) METHOD FOR FILLING INTO MULTILAYER BOTTLE

(75) Inventors: Jun Mitadera, Kanagawa (JP); Katsuya Maruyama, Kanagawa (JP); Kazunobu Maruo, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 870 days.

(21) Appl. No.: 12/160,907

(22) PCT Filed: Jan. 22, 2007

(86) PCT No.: PCT/JP2007/050876
§ 371 (c)(1),
(2), (4) Date: Jul. 15, 2008

(87) PCT Pub. No.: WO2007/086331
PCT Pub. Date: Aug. 2, 2007

(65) Prior Publication Data
US 2010/0180979 A1    Jul. 22, 2010

(30) Foreign Application Priority Data

Jan. 24, 2006 (JP) .................................. 2006-014709
Feb. 10, 2006 (JP) .................................. 2006-033551

(51) Int. Cl.
*A47J 41/00* (2006.01)
*B65B 3/02* (2006.01)
(52) U.S. Cl. ........................................ 53/452; 215/12.1
(58) Field of Classification Search .............. 53/452; 215/12.1, 12.2, 13.1
See application file for complete search history.

(56) References Cited

U.S. PATENT DOCUMENTS

| 5,175,238 A * | 12/1992 | Matlack et al. ............... 528/339 |
| 2004/0224112 A1 | 11/2004 | Maruyama et al. |
| 2005/0009976 A1 | 1/2005 | Akkapeddi et al. |

FOREIGN PATENT DOCUMENTS

| EP | 1 034 910 A1 | 9/2000 |
| GB | 2178015 | 2/1987 |
| JP | 2000-254963 | 9/2000 |
| JP | 2001-048182 | 2/2001 |
| WO | WO 2005-099996 A1 | 10/2005 |

OTHER PUBLICATIONS

Russian Official Action issued Aug. 13, 2010, for Russian Application No. 2008134521/12(043827).
N. I. Basov, et al., "Quality control of polymeric materials", *Chemistry*, 1977, pp. 50-53.

* cited by examiner

*Primary Examiner* — Thanh K Truong
*Assistant Examiner* — John Paradiso
(74) *Attorney, Agent, or Firm* — Antonelli, Terry, Stout & Kraus, LLP.

(57) ABSTRACT

There is provided a method for filling a multilayer bottle including outermost and innermost layers and at least one barrier layer interposed between the outermost and innermost layers, with a material to be stored therein. In the filling method, the material to be stored is filled in the multilayer bottle having the barrier layer satisfying a specific glass transition point (Tg) and a specific water content as measured by a Carl-Fisher method at 230° C. for 30 min. The multilayer bottle obtained by the filling method of the present invention hardly undergoes delamination between the layers owing to dropping or impact, and is applicable to a filling method such as hot filling.

20 Claims, 2 Drawing Sheets

METHOD FOR FILLING INTO MULTILAYER BOTTLE

TECHNICAL FIELD

The present invention relates to a method for preventing delamination of multilayer bottles, and more particularly to a method for preventing delamination of multilayer bottles owing to mechanical and thermal impact upon filling, upon transportation or upon dropping by filling the multilayer bottles whose barrier layer is controlled to satisfy specific conditions, with a material to be stored therein.

BACKGROUND ART

At present, plastic containers (bottles, etc.) made mainly of polyesters such as polyethylene terephthalate (PET) have been extensively used as containers for teas, fruit juice beverages, carbonated beverages, etc. Among these plastic containers, plastic bottles of a small size have increased in proportion year by year. In general, as the size of a bottle is reduced, a surface area thereof per unit volume of contents thereof (material stored therein) tends to increase. Therefore, a gustoish period of contents in the small-size bottles tends to be shortened. In recent years, beer susceptible to influences of oxygen and light as well as hot tea which are filled in a plastic bottle have been put on the market. Thus, with the recent tendency that the plastic containers are used in more extensive applications, the plastic containers have been required to be further improved in gas-barrier property.

To meet the above requirements, as the bottles imparted with a good gas-barrier property, there have been developed multilayer bottles produced from a thermoplastic polyester resin and a gas-barrier resin, blend bottles, barrier-coating bottles produced by forming a carbon coat, a deposited coat or a barrier resin coat onto a single layer bottle made of a thermoplastic polyester resin, etc.

As the multilayer bottles, for example, those bottles produced by subjecting a three- or five-layer preform (parison) obtained by injecting a thermoplastic polyester resin such as PET for forming innermost and outermost layers thereof and a thermoplastic gas-barrier resin such as poly-m-xylyleneadipamide (polyamide MXD6) into a mold cavity, to biaxial stretch blow molding, have been put into practice.

Further, resins having an oxygen-capturing function which are capable of capturing oxygen within a container while preventing penetration of oxygen into the container from outside have been developed and applied to multilayer bottles. The oxygen-capturing bottles are suitably in the form of a multilayer bottle including a gas-barrier layer made of polyamide MXD6 in which a transition metal-based catalyst is blended, from the viewpoints of oxygen-absorbing rate, transparency, strength, moldability, etc.

The above multilayer bottles have been used as containers for beer, tea, carbonated beverages, etc., because of their good gas-barrier property. When the multilayer bottles are used in these applications, contents filled therein can maintain a good quality with an improved shelf life. On the other hand, the multilayer bottles tend to undergo delamination between different resin layers, for example, between the innermost or outermost layer and the intermediate layer, resulting in significant damage to their commercial value.

There is disclosed such a method in which when a resin for forming the innermost and outermost layers is finally injected into a mold cavity, a given amount of the resin is allowed to flow black in the reverse direction toward the side of the intermediate gas-barrier layer using a reverse-flow controller to produce a preform containing a coarse mixed resin introduced between the layers, thereby improving a delamination resistance of the resultant multilayer bottle (refer to Patent Document 1). However, in this method, it is required to use the special apparatus. Also, there is disclosed the method of blending polyamide MXD6 with other polyamides to prevent crystallization of a barrier layer in a multilayer bottle, reduce a crystallization rate of the polyamide or transform the polyamide into uncrystallizable polyamide, thereby improving a delamination resistance of the resultant multilayer bottle (refer to Patent Document 2). However, in this method, in order to prevent crystallization of the polyamide MXD6 and reduce a crystallization rate thereof, a considerable amount of the nylons having a relatively poor gas barrier property as compared to the polyamide MXD6 must be added thereto. Therefore, the resultant multilayer bottle exhibits a poorer gas barrier property than those using the polyamide MXD6 only and, therefore, fails to improve a shelf life of contents therein to a sufficient extent. In addition, when mixing a transition metal-based catalyst having an oxygen-absorbing function in the polyamide for compensating the poor oxygen-barrier property, there arises such a problem that addition of the catalyst causes increase in costs. Also, even when adding the transition metal-based catalyst, the resultant bottle is not improved in carbon dioxide-barrier property and, therefore, still unsuitable as a container for beers or carbonated beverages. In the method described in the Patent Document 2, these polyamides must be melt-blended with each other using an extruder prior to molding of the bottle, resulting in increased production costs. Further, in this method, since a considerable amount of the amorphous polyamides is added, the resultant barrier layer exhibits a low crystallization rate and tends to be deformed upon heating, and is therefore unsuitable for use in filling methods such as hot filling.

Patent Document 1: JP 2000-254963A
Patent Document 2: USP 2005/0009976A

DISCLOSURE OF THE INVENTION

An object of the present invention is to solve the above conventional problems, and provide a method for filling a multilayer bottle with a material to be stored therein in which the multilayer bottle hardly undergoes occurrence of delamination between layers thereof even when exposed to impact upon filling, upon transportation or upon dropping, and is suitably filled by a hot filling method, etc.

As the result of extensive and intensive researches concerning delamination resistance of multilayer bottles, the present inventors have found that when filling a multilayer bottle having a barrier layer that is controlled to satisfy specific conditions, with a material to be stored therein, the thus filled multilayer bottle is improved in interlaminar bonding strength and prevented from suffering from delamination upon dropping, etc., and further the multilayer bottle is suitably filled with contents by various filling methods. The present invention has been accomplished on the basis of the above finding.

Thus, the present invention relates to a method for filling a multilayer bottle with a material to be stored therein, said multilayer bottle including outermost and innermost layers and at least one barrier layer interposed between the outermost and innermost layers, wherein the outermost and innermost layers are each made mainly of a thermoplastic polyester resin obtained by polymerizing a dicarboxylic acid component containing 80 mol % or more of terephthalic acid with a diol component containing 80 mol % or more of ethylene glycol; and the barrier layer satisfies the following conditions (1) and (2):

$$50° C. \leq Tg \leq 100° C. \quad (1)$$

$$Wb \leq 1\% \text{ by weight} \quad (2)$$

wherein Tg represents a glass transition point of the barrier layer; and Wb represents a water content of the barrier layer as measured by a Carl-Fisher method at 230° C. for 30 min.

Also, the present invention relates to a multilayer bottle being filled with a material to be stored therein which is obtained by the above method.

BEST MODE FOR CARRYING OUT THE INVENTION

Figure 1:
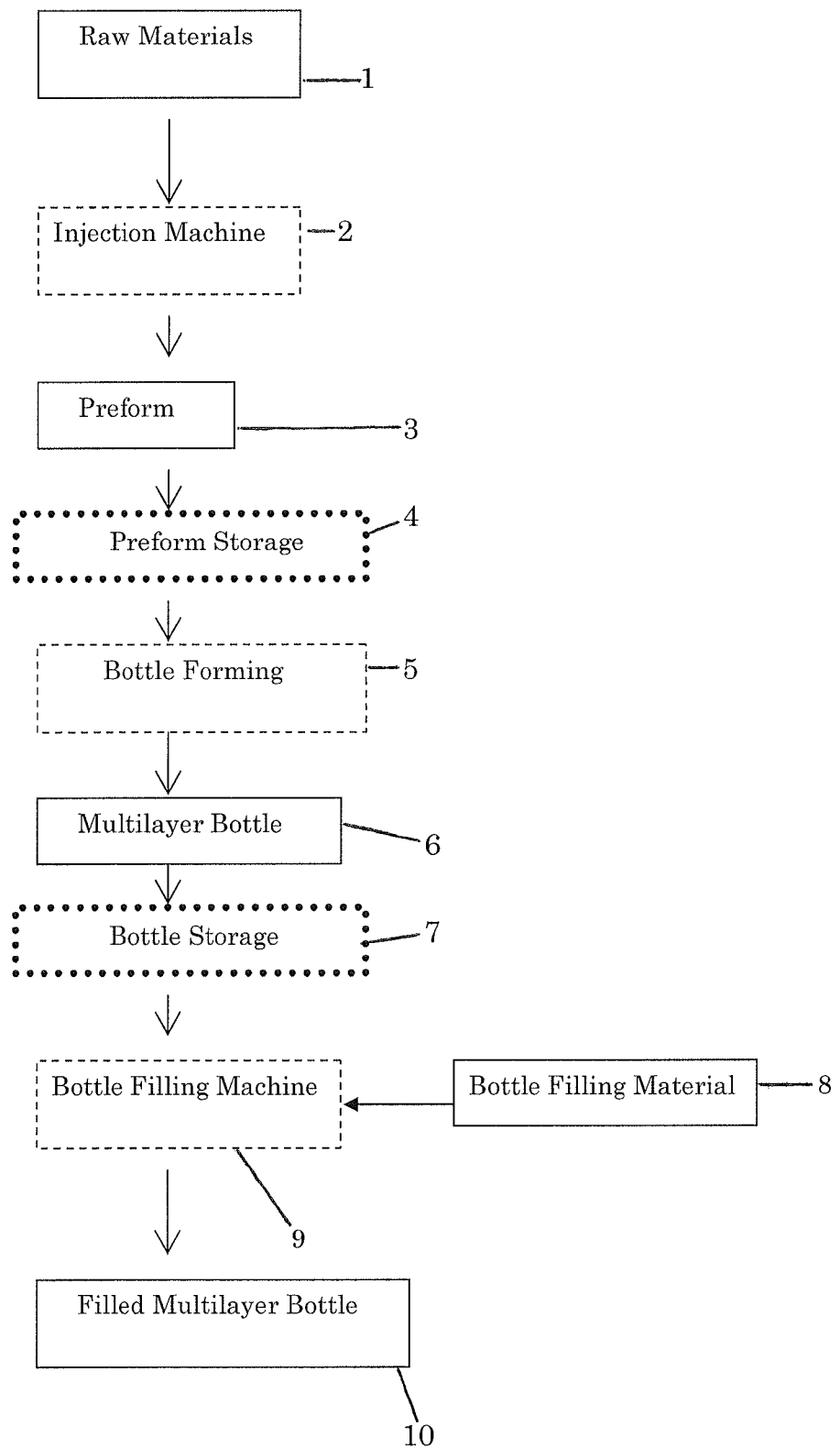
FIG. 1 shows the process flow according to aspects of the present invention, including filling a multilayer bottle with a material to be stored.

The thermoplastic polyester resin used for forming an outermost layer, an innermost layer and optionally an intermediate layer of the multilayer bottle according to the present invention is a polyester resin (hereinafter referred to merely as a "polyester A") which is obtained by polymerizing a dicarboxylic acid component containing terephthalic acid in an amount of 80 mol % or more and preferably 90 mol % or more (inclusive of 100 mol %) with a diol component containing ethylene glycol in an amount of 80 mol % or more and preferably 90 mol % or more (inclusive of 100 mol %).

The polyester A used in the present invention is preferably polyethylene terephthalate. The polyethylene terephthalate is preferred as a material for the outermost and innermost layers of the multilayer bottle because it is excellent in all of transparency, mechanical strength, injection moldability and stretch blow moldability.

Examples of dicarboxylic acids other than terephthalic acid which may be contained in the dicarboxylic acid component include isophthalic acid, diphenyl ether-4,4-dicarboxylic acid, naphthalene-1,4-dicarboxylic acid, naphthalene-2,6-dicarboxylic acid, adipic acid, sebacic acid, decane-1,10-dicarboxylic acid and hexahydroterephthalic acid. Examples of diols other than ethylene glycol which may be contained in the diol component include propylene glycol, 1,4-butanediol, neopentyl glycol, diethylene glycol, cyclohexane dimethanol, 2,2-bis(4-hydroxyphenyl)propane and 2,2-bis(4-hydroxyethoxyphenyl)propane. Further, oxy acids such as p-oxybenzoic acid may also be used as a raw monomer of the polyester A.

The polyester A preferably has an intrinsic viscosity of from 0.55 to 1.30 dL/g and more preferably from 0.65 to 1.20 dL/g. When the polyester A has an intrinsic viscosity of 0.55 dL/g or more, it is possible to produce not only a transparent amorphous multilayer preform but also a multilayer bottle having a satisfactory mechanical strength. Also, the polyester A having an intrinsic viscosity of 1.30 dL/g or less is free from deterioration in fluidity upon molding, resulting in facilitated production of a multilayer bottle.

The polyester A from which the outermost or innermost layer of the multilayer bottle is mainly formed may also be blended with other thermoplastic resins or various additives unless the addition thereof adversely affects the aimed effects of the present invention. In such a case, the outermost or innermost layer preferably contains the polyester A in an amount of 90% by weight or more. Examples of the other thermoplastic resins include thermoplastic polyester resins such as polyethylene-2,6-naphthalenedicarboxylate, polyolefin-based resins, polycarbonates, polyacrylonitrile, polyvinyl chloride and polystyrene.

Examples of the additives include ultraviolet absorbers, oxygen absorbers, colorants, and infrared absorbers (reheating additives) for accelerating heating of the preform and shortening a cycle time upon molding.

The oxygen transmission rate (OTR) of the barrier layer formed in a barrel portion of the multilayer bottle preferably satisfies the following formula as measured at a temperature of 23° C. and a relative humidity (RH) of 60%:

$$\text{OTR (average value)} \leq 0.2 \text{ cc·mm}/(\text{m}^2·\text{day·atm}).$$

The OTR more preferably satisfies the formula: OTR$\leq$0.15 cc·mm/(m$^2$·day·atm), still more preferably the formula: OTR$\leq$0.10 cc·mm/(m$^2$·day·atm) and further still more preferably the formula: OTR$\leq$0.08 cc·mm/(m$^2$·day·atm). Since the barrier layer used in the present invention has such an oxygen barrier property, the obtained multilayer bottle exhibits a good gas-barrier property and is capable of prolonging a consumable date of contents to be stored therein.

In the present invention, a material of the barrier layer is not particularly limited, and any resin (barrier resin) capable of satisfying the above condition for OTR may be used as the material of the barrier layer. Examples of the material of the barrier layer include various polyamides, ethylene/vinyl alcohol copolymers and polyglycolic acids (PGA).

The barrier layer is preferably made of a polyamide B obtained by polycondensing a diamine component containing 70 mol % or more (inclusive of 100 mol %) of m-xylylenediamine with a dicarboxylic acid component containing 70 mol % or more (inclusive of 100 mol %) of an α,ω-linear aliphatic dicarboxylic acid having 4 to 20 carbon atoms. The polyamide B has a high barrier property, and exhibits excellent properties including co-injection moldability and co-stretch blow moldability when molded together with the polyester A (mainly, polyethylene terephthalate), as well as a good shaping property.

The diamine component used for production of the polyamide B contains m-xylylenediamine in an amount of 70 mol % or more, preferably 75 mol % or more, and more preferably 80 mol % or more. When the content of m-xylylenediamine in the diamine component is less than 70 mol %, the obtained polyamide B tends to be deteriorated in gas-barrier property. Examples of diamines other than m-xylylenediamine which may be used in the diamine component include, but are not limited to, aliphatic diamines such as tetramethylenediamine, pentamethylenediamine, 2-methyl pentanediamine, hexamethylenediamine, heptamethylenediamine, octamethylenediamine, nonamethylenediamine, decamethylenediamine, dodecamethylenediamine, 2,2,4-trimethylhexamethylenediamine and 2,4,4-trimethylhexamethylenediamine; alicyclic diamines such as 1,3-bis(aminomethyl)cyclohexane, 1,4-bis(aminomethyl)cyclohexane, 1,3-diaminocyclohexane, 1,4-diaminocyclohexane, bis(4-aminocyclohexyl)methane, 2,2-bis(4-aminocyclohexyl)propane, bis(aminomethyl)decalin and bis(aminomethyl)tricyclodecane; and aromatic ring-containing diamines such as bis(4-aminophenyl) ether, p-phenylenediamine, p-xylylenediamine and bis(aminomethyl)naphthalene.

The dicarboxylic acid component used for production of the polyamide B contains an α,ω-linear aliphatic dicarboxylic acid having 4 to 20 carbon atoms in an amount of 50 mol % or more, preferably 70 mol % or more, and more preferably 80 mol % or more. When the content of the α,ω-linear aliphatic dicarboxylic acid in the dicarboxylic acid component lies within the above-specified range, the resultant polyamide B exhibits excellent gas-barrier property and moldability. Examples of the α,ω-linear aliphatic dicarboxylic acid having 4 to 20 carbon atoms which may be used in the present invention include aliphatic dicarboxylic acids such as succinic acid, glutaric acid, pimelic acid, suberic acid, azelaic acid, adipic acid, sebacic acid, undecanedioic acid and dodecanedioic acid. Among these α,ω-linear aliphatic dicarboxylic acids, preferred is adipic acid.

In the present invention, an aromatic dicarboxylic acid such as terephthalic acid, isophthalic acid and 2,6-naphthalenedicarboxylic acid may also be added as the dicarboxylic acid other than the α, ω-linear aliphatic dicarboxylic acid. The upper limit of the amount of the other aromatic dicarboxylic acid added is 50 mol%. Further, a small amount of a molecular weight controller such as monoamines and monocarboxylic acids may also be added upon the polycondensation for production of the polyamide. The dicarboxylic acid component used in the present invention preferably contains from 100 to 50 mol% of the α, ω-linear aliphatic dicarboxylic acid having 4 to 20 carbon atoms, and not less than 0 but less than 50 mol % of the other aromatic dicarboxylic acid.

The polyamide B may be produced by a melt-polycondensation method. For example, the polyamide B may be produced by the method of heating a nylon salt obtained from m-xylylenediamine and adipic acid under pressure in the presence of water, and polymerizing the salt kept in a molten state while removing water added and condensed water as produced, therefrom. Alternatively, the polyamide B may also be produced by the method of directly adding m-xylylenediamine to adipic acid kept in a molten state to subject these compounds to polycondensation under normal pressures. In the latter polycondensation method, in order to keep the reaction system in a uniform liquid state, m-xylylenediamine is continuously added to adipic acid, and the polycondensation reaction therebetween proceeds while heating the reaction system to a temperature not lower than the melting points of oligoamide and polyamide produced.

The polyamide B obtained by the melt-polycondensation method may be further subjected to solid-state polymerization. The method for producing the polyamide B is not particularly limited to the above method, and the polyamide B may be produced by using the conventionally known methods and polymerization conditions.

The number-average molecular weight of the polyamide B is preferably from 18000 to 43500 and more preferably from 20000 to 30000. When the number-average molecular weight of the polyamide B lies within the above specified range, a moldability of the resin material upon forming a multilayer bottle is enhanced, and the resultant multilayer bottle exhibits an excellent delamination resistance. Meanwhile, the polyamide B having a number-average molecular weight of from 18000 to 43500 exhibits a relative viscosity of from about 2.3 to about 4.2, and the polyamide B having a number-average molecular weight of from 20000 to 30000 exhibits a relative viscosity of from about 2.44 to about 3.19. Meanwhile, in the present invention, the relative viscosity may be obtained by measuring a viscosity of a solution prepared by dissolving 1 g of the polyamide in 100 ml of 96% sulfuric acid, at 25° C. using a Cannon-Fenske viscometer, etc.

The polyamide B may also contain a phosphorus compound in order to enhance a processing stability upon melt-molding or prevent undesired coloration of the polyamide. Examples of the phosphorus compound include phosphorus compounds containing alkali metals or alkali earth metals. Specific examples of the phosphorus compound include phosphates, hypophosphites and phosphites of alkali metals or alkali earth metals such as sodium, magnesium and calcium. Among these phosphorus compounds, hypophosphites of alkali metals or alkali earth metals are preferably used because they are excellent, in particular, in the effect of preventing coloration of the polyamide. The concentration of the phosphorus compound in the polyamide B is preferably from 1 to 500 ppm, more preferably 350 ppm or less and still more preferably 200 ppm or less in terms of phosphorus atom on the basis of the polyamide (B). Even when the concentration of phosphorus atom added exceeds 500 ppm, the effect of preventing coloration of the polyamide is no longer enhanced, and rather a haze of a film obtained from the polyamide tends to be undesirably increased.

The polyamide B may be blended with the other polyamides for the purpose of improving a delamination resistance of the resultant multilayer bottle. Examples of the other polyamides include, but are not particularly limited to, homopolymers such as poly(-aminohexanoic acid) (PA-6) also known as poly(caprolactam), poly(hexamethyleneadipamide) (PA-6,6), poly(7-aminoheptanoic acid) (PA-7), poly(10-aminodecanoic acid) (PA-10), poly(11-aminoundecanoic acid) (PA-11), poly(12-aminododecanoic acid) (PA-12), poly(hexamethylenesebacamide) (PA-6,10), poly(hexamethyleneazelamide) (PA-6,9) and poly(tetramethyleneadipamide) (PA-4,6); aliphatic polyamides such as caprolactam/hexamethyleneadipamide copolymer (PA-6,6/6) and hexamethyleneadipamide/caprolactam copolymer (PA-6/6,6); and amorphous semi-aromatic polyamides such as poly(hexamethyleneisophthalamide) (PA-6I), hexamethylenisophthalamide/hexamethyleneterephthalamide copolymer (PA-6I/6T), poly(m-xylyleneisophthalamide) (PA-MXDI), caprolactam/m-xylyleneisophthalamide copolymer (PA-6/MXDI) and caprolactam/hexamethyleneisophthalamide copolymer (PA-6/6I).

The barrier layer is preferably made mainly of the polyamide B. From the viewpoint of a good barrier property, the content of the polyamide B in the barrier layer is preferably 70% by weight or more, more preferably 80% by weight or more, and still more preferably 90% by weight or more (inclusive of 100% by weight). Depending upon kinds of resins or the like to be added to the polyamide B, if the content of the resins or the like in the barrier layer is more than 30% by weight, the above OTR of the barrier layer tends to exceed 0.2 cc·mm/(m$^2$·day·atm), resulting in deteriorated barrier property thereof.

The barrier layer may also contain one or plural kinds of other resins such as polyesters, polyolefins and phenoxy resins unless the addition of these resins adversely affects the aimed effects of the present invention. In addition, the barrier layer may also contain various additives. Examples of the plate-shaped additives include inorganic fillers such as glass fibers and carbon fibers; inorganic fillers such as glass flakes, talc, kaolin, mica, montmorillonite and organized clay; impact modifiers such as various elastomers; nucleating agents; lubricants such as fatty amide-based compounds and fatty acid metal salt-based compounds; antioxidants such as copper compounds, organic or inorganic halogen-based compounds, hindered phenol-based compounds, hindered amine-based compounds, hydrazine-based compounds, sulfur-based compounds and phosphorus-based compounds; heat stabilizers; anti-coloring agents; ultraviolet absorbers such as benzotriazole-based compounds; mold release agents; plasticizers; colorants; flame retardants; oxygen capturing agents such as cobalt-containing compounds; and anti-gelling agents such as alkali compounds.

In the filling method of the present invention, the glass transition point (Tg) and the water content (Wb: as measured by a Carl-Fisher method at 230° C. for 30 min) of the barrier layer formed in the multilayer bottle to be filled (multilayer bottle immediately before filled) are required to satisfy the following conditions (1) and (2), respectively:

$$50° C. \leq Tg \leq 100° C. \quad (1)$$

$$Wb \leq 1\% \text{ by weight} \quad (2).$$

The methods of measuring the glass transition point and the water content are described hereinlater.

The condition (1) is preferably 65° C.≦Tg≦90° C. and more preferably 75° C.≦Tg≦85° C. The Tg value of the barrier layer which lies within the above-specified range is close to Tg of the polyester A (about 75° C.), resulting in a good delamination resistance of the resultant multilayer bottle.

The condition (2) is preferably $W_b \leq 0.8\%$ by weight, more preferably $W_b \leq 0.8\%$ by weight and still more preferably $W_b \leq 0.5\%$ by weight. Although the water content of the barrier layer is preferably as low as possible, the lower limit of the water content of the barrier layer is usually about 0.01% by weight. When the water content of the barrier layer formed in the multilayer bottle immediately before filled lies within the above-specified range, the multilayer bottle exhibits a good delamination resistance even when the water content of the barrier layer increases owing to water absorption after the bottle is filled. Meanwhile, even though the barrier layer of the bottle has a water content exceeding 1% by weight, if the bottle is filled after drying the bottle until the water content of the barrier layer reaches 1% by weight or less, the bottle still exhibits a good delamination resistance. However, in order to attain a large effect of improving the delamination resistance, the water content of the barrier layer of the multilayer bottle before filled is preferably controlled not to exceed 1% by weight.

In the filling method of the present invention, the crystallization temperature of the barrier layer formed in the multilayer bottle (immediately before filled) is preferably from 80 to 170° C. and more preferably from 90 to 150° C. The quantity of heat of crystallization of the barrier layer (immediately before the bottle is filled) is preferably from 2 to 20 J/g and more preferably from 2.5 to 10 J/g. When the crystallization temperature and the quantity of heat of crystallization of the barrier layer lie within the above-specified ranges, the multilayer bottle is prevented from suffering from deteriorated delamination resistance owing to formation of spherulites and whitening of the barrier layer. In addition, the multilayer bottle is also prevented from being deteriorated in delamination resistance owing to excessive crystallization of the barrier layer.

In the filling method of the present invention, the multilayer bottle used therein is preferably produced by subjecting a multilayer preform as a precursor to blow molding by a so-called hot parison method or a so-called cold parison method, because a good shaping property of the preform into the bottle is ensured. The multilayer preform may be produced by conventionally known methods. For example, using an injection molding machine having two injection cylinders, the polyester A and the barrier resin are injected from the core-side and skin-side injection cylinders, respectively, through respective mold hot runners into a mold cavity, thereby producing the multilayer preform.

In the present invention, the multilayer bottle is especially preferably produced by subjecting the multilayer preform to biaxial stretch blow molding under the following conditions (I) to (IV):

(I) heating a surface of the multilayer preform to a temperature of from 90 to 110° C.;

(II) blowing a high-pressure air into the thus heated multilayer preform while stretching the multilayer preform in a longitudinal direction thereof in a mold and varying a pressure of the high-pressure air blown thereinto in multiple stages;

(III) controlling the pressure of the high-pressure air at a first stage of the multi-stage blowing (primary blow pressure) to from 0.5 to 2.0 MPa; and (IV) controlling the pressure of the high-pressure air at a final stage of the multi-stage blowing (secondary blow pressure) to from 2 to 4 MPa.

The temperature used for heating the surface of the multilayer preform is preferably from 90 to 110° C. and more preferably from 95 to 108° C. When the heating temperature lies within the above-specified range, a blow moldability of the preform is enhanced. Also, the barrier layer or the polyester A layer is prevented from undergoing cold stretching and whitening, or the barrier layer is free from crystallization and whitening, resulting in a good delamination resistance of the obtained multilayer bottle. Meanwhile, the temperature of the surface of the multilayer preform may be measured using an infrared radiation thermometer usually by setting an emissivity thereof to 0.95. The multilayer preform is usually heated by several or more heaters. At this time, an output balance of the individual heaters is also important. The output balance of the heaters as well as the heating temperature and the heating time of the preform may be appropriately determined depending upon temperature of outside air or temperature of the preform.

In the above process for producing the multilayer bottle, the pressure of the high-pressure air to be blown into the multilayer preform preferably varies in multiple stages (at least two stages) while stretching the multilayer preform in a longitudinal direction thereof within a mold. When the high-pressure air is blown into the multilayer preform while varying the pressure thereof in multiple stages, the shaping of the multilayer preform into the multilayer bottle is enhanced, resulting in a good delamination resistance of the obtained multilayer bottle.

The pressure of the high-pressure air blown at a first stage of the multi-stage blow (primary blow pressure) is preferably from 0.5 to 2.0 MPa, more preferably from 0.7 to 1.5 MPa and still more preferably from 0.8 to 1.3 MPa. When the pressure of the high-pressure air blown at the first stage is controlled to the above-specified range, the shaping of the multilayer preform into the multilayer bottle is enhanced, resulting in a good delamination resistance of the obtained multilayer bottle.

The pressure of the high-pressure air blown at a final stage of the multi-stage blow (secondary blow pressure) is preferably from 2 to 4 MPa, more preferably from 2.2 to 3.5 MPa and still more preferably from 2.4 to 3.0 MPa. When the pressure of the high-pressure air blown at the final stage is controlled to the above-specified range, the shaping of the multilayer preform into the multilayer bottle is enhanced, resulting in a good delamination resistance of the obtained multilayer bottle.

The time elapsed from the time of initiation of stretching the multilayer preform with a rod to the time of initiation of the first-stage blow (primary blow retardation time) is preferably from 0.1 to 0.5 s, more preferably from 0.2 to 0.4 s and still more preferably from 0.25 to 0.38 s. When the primary blow retardation time is controlled to the above-specified range, the shaping of the multilayer preform into the multilayer bottle is enhanced, resulting in a good delamination resistance of the obtained multilayer bottle.

The operating pressure of the rod is preferably from 0.2 to 1.0 MPa, more preferably from 0.3 to 0.8 MPa and still more preferably from 0.4 to 0.7 MPa. When the operating pressure of the rod is controlled to the above-specified range, the shaping of the multilayer preform into the multilayer bottle is enhanced, resulting in a good delamination resistance of the obtained multilayer bottle.

The time of application of the first-stage pressure in the multi-stage blowing (primary blow time) is preferably from 0.1 to 0.5 s, more preferably from 0.2 to 0.4 s and still more preferably from 0.25 to 0.38 s. When the primary blow time is controlled to the above-specified range, the shaping of the multilayer preform into the multilayer bottle is enhanced, resulting in a good delamination resistance of the obtained multilayer bottle.

The time of application of the final-stage pressure in the multi-stage blowing (secondary blow time) is preferably from 1 to 3 s, more preferably from 1.2 to 2.8 s and still more preferably from 1.5 to 2.5 s. When the secondary blow time is controlled to the above-specified range, the shaping of the multilayer preform into the multilayer bottle is enhanced, resulting in a good delamination resistance of the obtained multilayer bottle.

When subjecting the multilayer preform to blow molding by the above method, it is possible to obtain a multilayer bottle capable of satisfying such a condition that the degree of orientation (average value) of the barrier layer in a barrel portion thereof is preferably from 20 to 45 and more preferably from 25 to 45.

The degree of orientation used herein is calculated from refractive indices of the barrier layer as measured at 23° C. using an Abbe refractometer according to the following formula:

$$\text{Degree of orientation} = [\{n(x) + n(y)\}/2 - n(z)] \times 1000$$

where $n(x)$ represents a refractive index of the barrier layer in a height direction of the bottle; $n(y)$ represents a refractive index of the barrier layer in a circumferential direction of the bottle; and $n(z)$ represents a refractive index of the barrier layer in a thickness direction thereof.

Also, the degree of orientation (average value) of the barrier layer in a bottom portion of the bottle is preferably from 20 to 45 and more preferably from 25 to 45 when determined by the same method as used above.

The degree of orientation is used as an index showing a degree of orientation of a polymer molecule, i.e., a degree of crystallization thereof. The larger the degree of orientation, the higher the content of the well oriented polymer molecules. The degree of orientation of the barrier layer may be controlled by adjusting the blowing conditions therefor. When the blowing conditions such as primary blow pressure, primary blow retartdation time, secondary blow pressure and heating temperature of the surface of the multilayer preform are suitably adjusted such that the degree of orientation of the barrier layer lies within the above-specified range, the resultant barrier layer is kept in a uniformly stretched state, and exhibits a large distortion after the blow molding. As a result, the obtained multilayer bottle is improved in interlaminar bonding strength, resulting in a good delamination resistance between the respective layers thereof.

When subjecting the multilayer preform to blow molding by the above method, it is possible to obtain a multilayer bottle in which the thickness of the barrier layer thereof satisfies the following condition:

$$0 \leq b/a \times 100 \leq 200$$

wherein a represents an average thickness (μm) of the barrier layer in a barrel portion of the bottle; and b represents an average thickness (μm) of the barrier layer in a bottom portion of the bottle.

The condition of the thickness of the barrier layer is preferably $0 \leq b/a \times 100 \leq 150$.

The value "$b/a \times 100$" of more than 100 means that the thickness of the barrier layer in the bottom portion is larger than that in the barrel portion, whereas the value "$b/a \times 100$" of less than 100 means that the thickness of the barrier layer in the bottom portion is smaller than that in the barrel portion. The value "$b/a \times 100$" of 0 means that no barrier layer is present in the bottom portion. When no barrier layer is present in an entire part of the bottom portion, the resultant bottle tends to be deteriorated in barrier property. Therefore, the barrier layer is preferably omitted only in the bottom portion close to the ground portion but provided in the remaining bottom portion.

When the ratio of the thickness of the barrier layer in the bottom portion to the thickness of the barrier layer in the barrel portion lies within the above-specified range, the change in thickness of the barrier layer from the barrel portion to the ground portion is lessened and becomes moderated. Therefore, when the bottle is exposed to impact upon dropping, etc., the impact energy is not concentrated to a part of the barrier layer, and spread and relaxed over an entire part of the barrier layer in the bottle, resulting in less occurrence of delamination therein. In addition, since the barrier layer undergoes a less deformation when impact is applied to the bottle, delamination of the bottle is unlikely to occur. Further, even in the case of the bottle having irregularities or bends, since the impact applied thereto is received and relaxed by an entire part of the barrier layer, delamination of the bottle is unlikely to occur. Therefore, the shape of the multilayer bottle is not particularly limited to those having less irregularities and less bends, resulting in large freedom of design.

In order to control the thickness of the barrier layer in the multilayer bottle to the above-specified range, it is extremely important to suitably determine the conditions for blow molding. As described above, the blow molding is accomplished by blowing the high-pressure air into the heated multilayer preform in multiple stages while stretching the multilayer preform in a longitudinal direction thereof within a mold using the rod. The stretched condition of the preform varies depending upon the blowing conditions such as heating temperature and heating time of the preform, speed of the stretching rod, timing for blowing the high-pressure air and pressure of the high-pressure air. When controlling these blowing conditions to the above-specified ranges, the thickness of the barrier layer is adjusted to the above suitable range, thereby enabling production of the multilayer bottle having a good delamination resistance.

From the viewpoints of excellent barrier property and moldability, the multilayer bottle of the present invention preferably has a three-layer structure constructed successively from a polyester A layer, a barrier layer and a polyester A layer, or a five-layer structure constructed successively from a polyester A layer, a barrier layer, a polyester A layer, a barrier layer and a polyester A layer.

The multilayer bottle having a three-layer structure or a five-layer structure may be produced by subjecting a multilayer preform having a three-layer structure or a five-layer structure to biaxial stretch blow molding. The method of producing the multilayer preform having a three-layer structure or a five-layer structure is not particularly limited, and the multilayer preform may be produced by any suitable conventionally known methods. For example, the polyester A forming the innermost and outermost layers of the multilayer preform is first injected from the skin-side injection cylinder of the injection molding machine. Then, the resin material forming the barrier layer and the polyester A are injected at the same time from the core-side injection cylinder and the skin-side injection cylinder, respectively, and further a necessary amount of the polyester A is injected from the skin-side injection cylinder to fill a cavity of the mold, thereby producing the multilayer preform having a three-layer structure constructed successively from a polyester A layer, a barrier layer and a polyester A layer.

Also, the polyester A is first injected from the skin-side injection cylinder of the injection molding machine, and then the resin material forming the barrier layer solely is injected from the core-side injection cylinder, and finally the polyester A is injected from the skin-side injection cylinder to fill the cavity of the mold, thereby producing the multilayer preform having a five-layer structure constructed successively from a polyester A layer, a barrier layer, a polyester A layer, a barrier layer and a polyester A layer.

Meanwhile, the method for producing the multilayer preform is not limited only to the above methods.

The thickness of the polyester A layer in the multilayer bottle is preferably from 0.01 to 1.0 mm, and the thickness of the barrier layer therein is preferably from 0.005 to 0.2 mm (from 5 to 200 μm). The thickness of the multilayer bottle is not necessarily constant over an entire part thereof, and is usually in the range of from 0.2 to 1.0 mm.

In the multilayer bottle obtained by subjecting the multilayer preform to biaxial stretch blow molding, the barrier layer may be provided at least in a barrel portion of the multilayer bottle in order to allow the bottle to exhibit a good gas-barrier property. However, when the barrier layer extends up to near a tip end of a mouth portion of the bottle, the gas-barrier property of the multilayer bottle can be further enhanced.

If the barrier layer is inappropriately distributed in the multilayer preform, the thickness of the barrier layer in the multilayer bottle obtained after the blowing tends to be out of the above-specified range. Therefore, the multilayer preform must be adequately designed in view of stretch ratio, etc. Meanwhile, the stretch ratio upon forming the preform into the bottle is usually from about 9 to about 13 times.

The weight percentage of the barrier layer in the multilayer bottle used in the present invention is preferably from 1 to 20% by weight, more preferably from 2 to 15% by weight and still more preferably from 3 to 10% by weight on the basis of a total weight of the multilayer bottle. When the weight percentage of the barrier layer lies within the above-specified range, the resultant multilayer bottle exhibits a good gas-barrier property, and the multilayer preform as a precursor is readily molded into the multilayer bottle, resulting in an excellent delamination resistance of the resultant multilayer bottle.

The water content (Wp) of the barrier layer in the multilayer preform immediately before blow-molding the preform into the multilayer bottle preferably satisfies the following condition (3):

$$Wp \leq 1\% \text{ by weight} \tag{3}$$

The above condition (3) is more preferably $Wp \leq 0.7\%$ by weight, still more preferably $Wp \leq 0.5\%$ by weight and further still more preferably $Wp \leq 0.3\%$ by weight. The lower limit of the water content (Wp) is usually 0.005% by weight. When the water content (Wp) satisfies the above-specified condition, the multilayer preform is readily blow-molded into the multilayer bottle, and the barrier layer is prevented from undergoing crystallization during the blowing step, resulting in a good delamination resistance of the obtained multilayer bottle. In addition, under the above condition, the resultant multilayer bottle exhibits a low water content, and further the barrier layer is prevented from suffering from whitening owing to water absorption.

In order to maintain the water content (Wp) within the above-specified range, the multilayer preform is preserved in a bag made of a film having a water vapor permeability of preferably 20 $g/m^2 \cdot day$ or less, more preferably 10 $g/m^2 \cdot day$ or less, still more preferably 5 $g/m^2 \cdot day$ or less and further still more preferably 2.5 $g/m^2 \cdot day$ or less, until blow-molding the preform into the multilayer bottle. The preservation period of the multilayer preform is not particularly limited as long as the water content (Wp) is maintained within the above-specified range. Upon practical production of the multilayer bottle, the multilayer preform is usually preserved in the bag over 365 days.

The material and the like of the film forming the bag are not particularly limited as long as the film satisfies the above water vapor permeability. Examples of the preferred film include polyethylene films, polypropylene films, silica-deposited films, aluminum-deposited films and aluminum-laminated films. Examples of polyethylene used as a material of the polyethylene films include high-density polyethylene (HDPE), high-pressure low-density polyethylene (LDPE), linear low-density polyethylene (L-LDPE) and polyethylenes produced in the presence of metallocene catalysts. The density of these polyethylenes is not particularly limited, and preferably from about 0.9 to about 0.96. Also, the kinds of the polyethylenes are not particularly limited, and there may be suitably used polyethylenes of a homo-type, a block-type, a random-type and a metallocene-type. The thickness of the film is not particularly limited. In view of a good handing property, the thickness of the film is preferably from about 10 to about 500 μm, more preferably from about 20 to about 300 μm and still more preferably from about 50 to about 200 μm.

Upon preserving the multilayer preform in the bag, the opening of the bag is preferably tied by a string or a tying band such as a so-called Insulok and more preferably closed by heat sealing. The multilayer preform is preferably preserved in the presence of a drying agent in order to prevent moisture absorption therein. As the drying agent, there may be suitably used silica gel, zeolite, etc. Examples of the silica gel include A-type silica gel and B-type silica gel, although not particularly limited thereto. Among these silica gels, preferred are spherical silica gels. In addition, the silica gel is preferably packaged with a non-woven fabric, a porous polyolefin-based film, etc.

In the filling method of the present invention, the multilayer bottle is preferably heat-set within a blow mold. The heat-set multilayer bottle is prevented from suffering from shrinkage of the polyester A and the polyamide B contained therein with time. As a result, the multilayer bottle is inhibited from undergoing deformation as well as thermal shrinkage owing to heat sterilization (pasteurization), hot filling, heat preservation, etc., resulting in a good delamination resistance thereof. The heat setting may be carried out under conventionally known conditions. For example, the mouth portion of the multilayer preform is first crystallized by infrared heating and then heat-set in the mold at a mold temperature of preferably from 130 to 180° C. and more preferably from 145 to 165° C. for a period of preferably from 1 to 20 s and more preferably from 3 to 10 s.

The multilayer bottle is preferably filled with contents to be stored therein within one week and more preferably within 3 days after completion of the blow molding. In particular, the multilayer preform is preferably blow-molded into the multilayer bottle in the place where the multilayer bottle is filled with the contents to be stored therein, i.e., the contents to be stored are preferably filled into the blow-molded multilayer bottle in an in-line (in-plant) manner. If the multilayer bottle is preserved after the blow molding, the barrier layer of the multilayer bottle tends to undergo decrease in Tg owing to water absorbed therein depending upon the preserving conditions, thereby failing to satisfy the above conditions (1) and/or (2). The multilayer bottle is preferably rapidly filled with the contents after completion of the blow molding and then preserved, because the thus filled multilayer bottle still exhibits a good delamination resistance even after preserved as compared to the case where the unfilled multilayer bottle is preserved for the same period of time and then filled. When filling the multilayer bottle with the contents by the method of the present invention, the multilayer bottle is prevented from being deteriorated in delamination resistance even though the barrier layer thereof undergoes decrease in Tg owing to water absorbed therein. The reason therefor is suggested as follows. That is, when water is absorbed in the multilayer bottle filled with the contents, an inside pressure, etc., of the bottle are different from those of the bottle unfilled with the contents, leading to the difference between conditions of the barrier layers in the filled and unfilled multilayer bottles, such as stress and shrinkage thereof.

The filling method of the present invention is also preferably applicable to hot filling. The hot filling means such a method of filling the multilayer bottle with contents heated to a temperature of from 85 to 95° C., sealing the multilayer bottle, and then preserving the thus filled bottle at room temperature or under a constant temperature condition to sterilize the contents. The hot filling is suitable for preserving the contents such as fruit juices, vegetable juices, fruit juice-containing beverages, sour beverages, sports drinks and teas. For the purpose of the hot filling, heat-resistant bottles as heat-set by the above method are preferably used.

In the filling method of the present invention, aseptic (sterile) filling is preferably used. The aseptic (sterile) filling means such a method of filling contents previously sterilized into a sterile packaging material under sterile environmental conditions. Upon the aseptic (sterile) filling, since the contents are filled in the multilayer bottle at ordinary temperature, it is not required that the multilayer bottle is subjected to treatments for imparting a heat resistance thereto as well as sterilization treatments after being filled, resulting in less occurrence of deformation of the bottle and a good delamination resistance thereof.

In accordance with the filling method of the present invention, the resultant filled multilayer bottle exhibits a good delamination resistance. Therefore, the filling method of the present invention is suitably applicable to preservation of various products such as liquid beverages such as carbonated beverage, juice, water, milk, sake, whisky, shochu, coffee, tea, jelly beverage and healthy beverage, seasonings such as liquid seasoning, sauce, soy sauce, dressing and liquid soup stock, liquid processed foodstuffs such as liquid soup, liquid drugs, liquid cosmetics such as beauty wash, milky lotion and hair dressing, liquid hair care products such as hair dye and shampoo, etc. In particular, the filling method of the present invention is preferably applicable to preservation of beers and carbonated beverages.

FIG. 1 shows a process flow according to an aspect of the present invention. Reference character 1 shows the raw materials, fed to an injection machine (see reference character 2) for injection molding to form a preform 3 by injection molding. According to aspects of the present invention, the preform can be stored for some period at various environments (note reference character 4 of FIG. 1). The preforms are stored to satisfy formulas (1) and (2), e.g., in a bag having specific water vapor permeability as discussed in the foregoing, to control moisture adsorption. Shown by reference character 5 is the forming of the bottles by blow molding the preforms, using a blow molding machine, thereby forming the multilayer bottle (note reference character 6 of FIG. 1). After forming the multilayer bottle, the bottle can be stored for some period at various environments, satisfying the formulas (1) and (2) as described in the foregoing. That is, the Tg and moisture of the barrier layer of the multilayer bottles are controlled. Thereafter, a material to be stored (note reference character 8 of FIG. 1) is filled in the bottle, using a filling machine (denoted by reference character 9 in FIG. 1), thereby providing the multilayer bottle filled with material to be stored (denoted by reference character 10 in FIG. 1).

Figure 2B:
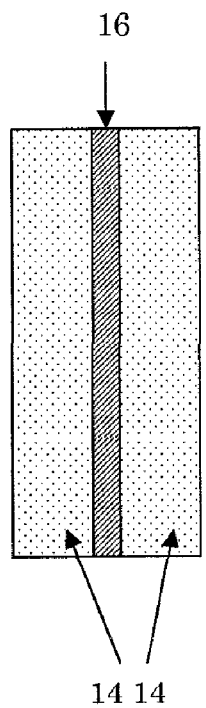
FIGS. 2(a) and (b) respectively shows a multilayer bottle used according to an aspect of the present invention, and shows a cross-section of a barrel portion of the bottle of FIG. 2(a).
Figure 2A:
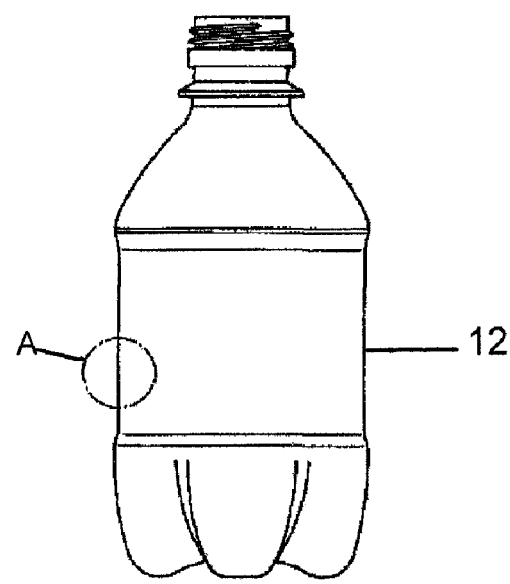
Figure 3B:
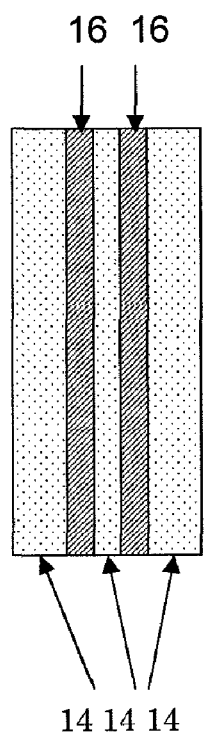
FIGS. 3(a) and (b) respectively shows another multilayer bottle which can be used in the process of the present invention, and shows a cross-section of a barrel portion of this bottle of FIG. 3(a).
Figure 3A:
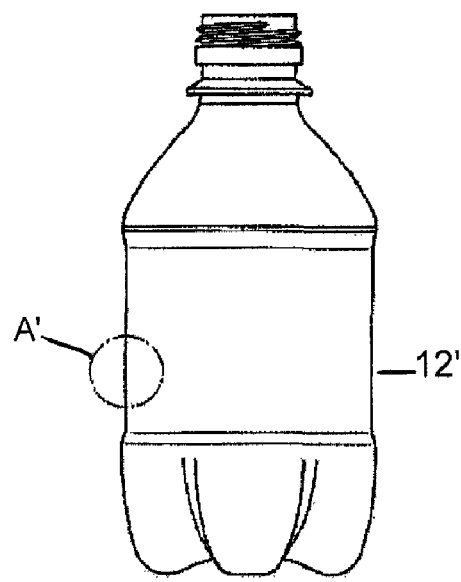

FIGS. 2(*a*) and 3 (*a*) are illustrations of bottles which can be used in the method according to the present invention. FIGS. 2(*b*) and 3(*b*) respectively are cross-sections of barrel portions A and A' respectively of FIGS. 2(*a*) and 3(*a*). Thus, FIG. 2(*a*) shows a three-layer bottle 12, with sandwiching PET layers 14, 14 and barrier layer 16. FIG. 3(*a*) shows a five-layer bottle 12', with three PET layers 14, 14 and 14 and two barrier layers 16, 16, the PET layers sandwiching the barrier layers and forming outer and inner sides of the bottle 12'.

EXAMPLES

The present invention is described in more detail below with reference to the following examples and comparative examples. However, these examples are only illustrative and not intended to limit the invention thereto. Meanwhile, various properties of the multilayer bottle were evaluated by the following methods.

(1) Height of Delamination

The delamination resistance of the multilayer container was evaluated by a height of delamination as measured by subjecting the container to drop test according to ASTM D2463-95 Procedure B. The larger height of delamination indicates a higher delamination resistance. Specifically, first, the multilayer container to be tested was filled with water and capped, and then dropped to visually observe occurrence of any delamination therein. At this time, the multilayer container is vertically dropped such that a bottom portion of the multilayer container was impinged against a floor. The drop test was repeated while the drop height of the multilayer container was increased and decreased at intervals of 15 cm. The number of the multilayer container subjected to the drop test was 30.

(2) Oxygen Transmission Rate (OTR)

The oxygen transmission rate (OTR) was measured at 23° C. and a relative humidity of 50% according to ASTM D3985 using a measuring apparatus "OX-TRAN 10/50A" available from Modern Controls Corp. Meanwhile, upon measuring an oxygen transmission rate (OTR) of the barrier layer of the bottle, the bottle was carefully delaminated to separate and sample the barrier layer solely therefrom. In the case where it was difficult to separate and sample the barrier layer solely from the bottle, the OTR of the barrier layer was determined as follows. That is, a barrel portion of the bottle composed of the polyester A layers and the barrier layer was cut into a sheet to measure OTR of the multilayer sheet, and then thicknesses of the respective layers thereof were measured using a microscope, etc. The OTR of the barrier layer only was calculated from the measured OTR of the sheet, the thicknesses of the respective layers and the known OTR value of the polyester A layer. In addition, the OTR of the barrier layer may also be calculated from OTR of the bottle, surface area of the bottle and the thicknesses of the respective layers.

(3) Glass Transition Point (Tg)

The bottle was carefully delaminated to separate and sample the barrier solely therefrom, and the glass transition point of the barrier layer was measured by a DSC method (differential scanning calorimetry). Upon the DSC measurement, using "DSC-50" available from Shimadzu Seisakusho Co., Ltd., the glass transition point was determined from a DSC curve prepared by heating about 5 mg of the sample from room temperature to 300° C. at a temperature rise rate of 10° C/min. The glass transition point adopted herein was a so-called midpoint temperature (Tgm). Meanwhile, as widely known, the midpoint temperature (Tgm) means such a temperature read out from the DSC curve as a mid point between two intersection points at which tangent lines of respective base lines of a glass state and a supercooling state (rubber state) cross with a tangent line of a transition slope.

(4) Water Content

The bottle or the preform was carefully delaminated to separate and sample the barrier solely therefrom, and the water content of the barrier layer was measured by a Carl-Fischer method using "AQ-2000" available from Hiranuma Sangyo Co., Ltd. The measuring temperature was 235° C., and the measuring time was 30 min.

(5) Crystallization Temperature and Quantity of Heat of Crystallization

The crystallization temperature and quantity of heat of crystallization were measured by a DSC method (differential scanning calorimetry). Specifically, using "DSC-50" available from Shimadzu Seisakusho Co., Ltd., the crystallization temperature and quantity of heat of crystallization were determined from an exothermic peak in a DSC curve prepared by heating about 5 mg of the sample from room temperature to 300° C. at a temperature rise rate of 10° C./min.

(6) Degree of Orientation

Using an Abbe refractometer "DR-M2" available from Atago Co., Ltd., the refractive index of the barrier layer was measured at 23° C. by applying a sodium D ray (589 nm) thereto to calculate a degree of orientation thereof according to the formula described previously.

(7) Shaping Property

The shaping property was evaluated by visually observing a bottom portion of the multilayer bottle to examine whether or not a petaloid shape of a mold was well transferred to the bottom portion.

Example 1

Under the following conditions, the raw resin materials were injection-molded to form a three-layer preform (27 g) constructed successively from a polyester A layer, a barrier layer and a polyester A layer, followed by cooling the resultant preform. The water content of the barrier layer in the obtained multilayer preform was 0.12% by weight. After cooling, the resultant multilayer preform was rapidly heated and subjected to biaxial stretch blow molding, thereby obtaining a multilayer bottle. Various properties of the barrier layer of the multilayer bottle (immediately before filling water therein) are shown in Table 1.

The thus obtained multilayer bottle was rapidly filled with water (23° C.) to evaluate a delamination resistance thereof. The results are shown in Table 1.

Polyester Layer

Polyethylene terephthalate "RT543C" available from Nippon Unipet Co., Ltd.

Intrinsic viscosity: 0.75 dL/g (as measured at 30° C. in a mixed solvent containing phenol and tetrachloroethane at a weight ratio of 6/4).

Barrier Layer

Polyamide MXD6 ("MX Nylon 56007" available from Mitsubishi Gas Chemical Co., Inc.)

Relative viscosity: 2.70

Shape of Three-Layer Preform

Whole length: 95 mm; outer diameter: 22 mm; wall thickness: 4.2 mm

The three-layer preform was produced using an injection molding machine (Model: "M200"; four-shot molding type) available from Meiki Seisakusho Co., Ltd.

Molding Conditions for Three-layer Preform

Skin-side injection cylinder temperature: 280° C.
Core-side injection cylinder temperature: 260° C.
Mold runner temperature: 280° C.
Mold cooling water temperature: 15° C.
Proportion of barrier resin in preform: 5% by weight Shape of Multilayer Bottle Whole length: 223 mm; outer diameter: 65 mm; capacity: 500 mL; bottom shape: petaloid type; no dimples in a barrel portion.

The biaxial stretch blow molding was performed by using a blow molding machine (Model: "EFB100ET") available from Frontier Inc.

Conditions of Biaxial Stretch Blow Molding

Heating temperature of preform: 101° C.
Pressure applied to stretching rod: 0.5 MPa
Primary blow pressure: 1.1 MPa
Secondary blow pressure: 2.5 MPa
Primary blow retardation time: 0.34 s
Primary blow time: 0.30 s
Secondary blow time: 2.0 s
Blow evacuation time: 0.6 s
Mold temperature: 30° C.

Examples 2 to 4 and Comparative Examples 1 and 2

The multilayer bottle produced in the same manner as in Example 1 was preserved under the conditions shown in Table 1. The Tg values after preserved and immediately before filled with water, water content, OTR and delamination resistance are shown in Table 1.

Example 5

The multilayer bottle obtained in Comparative Example 1 whose barrier layer had Tg of 48° C. and a water content of 3% by weight was dried at 30° C. in vacuum to control the Tg and water content of the barrier layer to 70° C. and 0.8% by weight, respectively. The resultant multilayer bottle was rapidly filled with water to evaluate a delamination resistance thereof. The results are shown in Table 1. Meanwhile, although the quantity of heat of crystallization of the barrier layer in the multilayer bottle was out of the above preferred range (from 2 to 20 J/g), the reason therefor is considered to be that crystallization of the barrier layer proceeded upon the drying. Therefore, it is considered that the effect of improving a delamination resistance of the multilayer bottle was somewhat deteriorated owing to the crystallization of the barrier layer as compared to the case where the water content of the barrier layer was controlled so as not to exceed 1% by weight.

evaluate a delamination resistance thereof. As a result, it was confirmed that the height of delamination of the multilayer bottle was 270 cm.

Examples 8 to 12 And Comparative Example 3

One hundred multilayer preforms produced in the same manner as in Example 1 were preserved under the conditions shown in Table 2 to control a water content of the barrier layer. The preforms after preserved were subjected to blow molding

TABLE 1

|  | Examples | | | | | Comparative Examples | |
| --- | --- | --- | --- | --- | --- | --- | --- |
|  | 1 | 2 | 3 | 4 | 5 | 1 | 2 |
| Preserving conditions | | | | | | | |
| Preservation temperature (° C.) | — | 23 | 10 | 30 | — | 23 | 23 |
| Preservation humidity (% RH) | — | 60 | 25 | 70 | — | 50 | 50 |
| Preservation period (day) | 0 | 3 | 7 | 2 | — | 14 | 7 |
| Properties of barrier layer | | | | | | | |
| Tg (° C.) | 86 | 80 | 84 | 67 | 70 | 48 | 55 |
| Water content (wt %) | 0.12 | 0.62 | 0.5 | 0.8 | 0.8 | 3 | 1.5 |
| Crystallization temperature (° C.) | 110 | 102 | 106 | 95 | 95 | 70 | 74 |
| Quantity of heat of crystallization (J/g) | 4 | 3.8 | 3.9 | 3 | 0 | 1 | 1.4 |
| OTR [cc · mm/(m$^2$day · atm)] | 0.068 | 0.07 | 0.073 | 0.081 | 0.07 | 0.08 | 0.072 |
| Height of delamination (cm) | 280 | 275 | 290 | 296 | 200 | 92 | 120 |

Example 6

The multilayer bottle produced in the same manner as in Example 1 was filled with water and preserved for 14 days in the same manner as in Comparative Example 1, and then the delamination resistance of the multilayer bottle was evaluated. As a result, it was confirmed that the height of delamination of the multilayer bottle was 283 cm which was therefore substantially the same result as that of Example 1.

Example 7

The multilayer bottle was produced in the same manner as in Example 1 except that the preform whose mouth portion was previously heated and crystallized was subjected to blow molding, and then heat-set at a mold temperature of 145° C. for 5 s, thereby obtaining a multilayer bottle. As a result, it was confirmed that the barrier layer of the thus obtained multilayer bottle had Tg of 86° C., a water content of 0.1% by weight and OTR of 0.056 cc·mm/(m$^2$·day·atm). The multilayer bottle was hot-filled with water heated to 85° C. to in the same manner as in Example 1, thereby obtaining multilayer bottles. The thus obtained multilayer bottles were preserved at 23° C. and 50% RH for one day and then immediately filled with water (23° C.) to evaluate a delamination resistance of the bottle. The Tg and water content of the barrier layer and the delamination resistance of the bottle immediately before filled with water are shown in Table 2. As a result, it was confirmed that no whitening was observed in the thus obtained multilayer preforms and multilayer bottles (Examples 8 to 12). However, in Comparative Example 3, the barrier layer of the preform after preserved was partially whitened.

Meanwhile, the opening of the polyethylene bag used for preserving the respective multilayer preforms was sealed by Insulok (Examples 10 and 11). On the other hand, the opening of the bag made of an aluminum-laminated film was heat-sealed (Example 12). The preservation of the multilayer preform in the bag was carried out in the presence of a drying agent (i.e., in a non-woven fabric bag containing 200 g of silica gel) (Example 11).

TABLE 2

|  | Examples | | | | | Comparative Example |
| --- | --- | --- | --- | --- | --- | --- |
|  | 8 | 9 | 10 | 11 | 12 | 3 |
| Multilayer preform | | | | | | |
| Preservation temperature (° C.) | 23 | 23 | 23 | 23 | 23 | 40 |
| Preservation humidity (% RH) | 50 | 50 | 50 | 50 | 50 | 80 |
| Preservation period (day) | 7 | 14 | 7 | 7 | 7 | 7 |
| Bag | — | — | 1* | 1* | 2* | — |
| Drying agent | — | — | — | Used | — | — |
| Water content of barrier layer (wt %) | 0.39 | 0.61 | 0.25 | 0.17 | 0.18 | 1.25 |

TABLE 2-continued

|  | Examples | | | | | Comparative Example |
|---|---|---|---|---|---|---|
|  | 8 | 9 | 10 | 11 | 12 | 3 |
| Multilayer bottle | | | | | | |
| Tg (° C.) | 82 | 70 | 85 | 85 | 85 | 60 |
| Water content of barrier layer (wt %) | 0.56 | 0.78 | 0.42 | 0.34 | 0.35 | 1.25 |
| Height of delamination (cm) | 280 | 270 | 287 | 291 | 294 | 125 |

Note
1*: Made of a polyethylene film having a thickness of 100 μm
2*: Made of an aluminum-laminated film having a thickness of 125 μm As described above, the filled multilayer bottles obtained according to the filling method of the present invention exhibited a very excellent delamination resistance, whereas the filled bottles produced by the method not satisfying the requirements of the present invention were deteriorated in delamination resistance. Even when the multilayer bottles were filled with contents to be stored therein and then preserved, the delamination resistance thereof was still excellent as compared to the case where an empty bottle was preserved for the same period of time and then filled with the contents.

Example 13

The multilayer bottle was produced in the same manner as in Example 1, and then filled with water. The production conditions and measurement results are shown in Tables 3 to 5.

Examples 14 to 16 and Comparative Examples 4 and 5

The same procedure as in Example 13 was repeated except for varying the blow molding conditions. In Comparative Example 4, the blow molding was conducted in one stage. The production conditions and measurement results are shown in Tables 3 to 5. Meanwhile, in Comparative Example 5, the blow molding failed to produce a multilayer bottle.

TABLE 3

|  | Examples | | | | Comparative Examples | |
|---|---|---|---|---|---|---|
|  | 13 | 14 | 15 | 16 | 4 | 5 |
| Heating temperature of preform (° C.) | 101 | 95 | 108 | 105 | 106 | 105 |
| Operating pressure of stretching rod (MPa) | 0.5 | 0.35 | 0.8 | 0.55 | 0.5 | 0.5 |
| Primary blow pressure (MPa) | 1.1 | 0.6 | 1.5 | 0.9 | 0.6 | 2.3 |
| Secondary blow pressure (MPa) | 2.5 | 2.1 | 3.1 | 2.7 | — | 2.5 |
| Primary blow retardation time (s) | 0.34 | 0.16 | 0.41 | 0.30 | — | 0.36 |
| Primary blow time (s) | 0.30 | 0.20 | 0.40 | 0.29 | 3.00 | 0.30 |
| Secondary blow time (s) | 2.0 | 1.2 | 2.8 | 2.0 | — | 2.0 |
| Blow evacuation time (s) | 0.6 | 0.6 | 0.6 | 0.6 | 0.6 | 0.6 |
| Mold temperature (° C.) | 30 | 36 | 38 | 20 | 30 | 30 |

TABLE 4

|  | Examples | | | | Comparative Examples | |
|---|---|---|---|---|---|---|
|  | 13 | 14 | 15 | 16 | 4 | 5 |
| Height from ground portion of bottle (mm) | | | | | | |
| (1) Shoulder portion | | | | | | |
| 190 | 42 | 53 | 63 | 48 | 48 | — |
| 180 | 32 | 40 | 50 | 39 | 39 | — |
| 170 | 27 | 33 | 43 | 34 | 34 | — |
| 160 | 24 | 28 | 41 | 30 | 30 | — |
| 150 | 23 | 26 | 35 | 29 | 29 | — |
| 140 | 22 | 23 | 31 | 29 | 27 | — |
| 130 | 21 | 21 | 27 | 28 | 25 | — |
| (2) Barrel portion | | | | | | |
| 120 | 20 | 21 | 26 | 28 | 23 | — |
| 110 | 20 | 21 | 25 | 27 | 20 | — |
| 100 | 20 | 20 | 25 | 27 | 19 | — |
| 90 | 20 | 20 | 26 | 27 | 20 | — |
| 80 | 20 | 21 | 26 | 27 | 18 | — |
| 70 | 20 | 20 | 26 | 27 | 17 | — |
| 60 | 20 | 20 | 25 | 28 | 20 | — |
| 50 | 20 | 20 | 25 | 20 | 26 | — |
| (3) Bottom portion | | | | | | |
| 40 | 22 | 21 | 25 | 15 | 30 | — |
| 30 | 23 | 21 | 25 | 12 | 37 | — |
| 20 | 25 | 24 | 27 | 8 | 42 | — |
| 10 | 31 | 27 | 26 | 3 | 47 | — |
| 0 | 36 | 29 | 27 | 0 | 50 | — |
| Average in barrel portion (a) | 20 | 20 | 26 | 26 | 20 | — |
| Average in bottom portion (b) | 28 | 24 | 26 | 8 | 41 | — |
| b/a × 100 | 137 | 119 | 102 | 29 | 202 | — |

TABLE 5

|  | Examples | | | | Comparative Examples | |
|---|---|---|---|---|---|---|
|  | 13 | 14 | 15 | 16 | 4 | 5 |
| Degree of orientation | 29 | 23 | 31 | 25 | 5 | — |
| Shaping property | Good | Good | Good | Good | Poor | — |
| Height of delamination (cm) | 280 | 275 | 290 | 295 | 92 | — |
| OTR [cc · mm/(m² · day · atm)] | 0.075 | 0.082 | 0.073 | 0.081 | 0.084 | — |

INDUSTRIAL APPLICABILITY

In accordance with the present invention, there can be obtained a multilayer bottle filled with contents to be stored therein which hardly undergoes delamination. Therefore, the multilayer bottle is prevented from suffering from delamination without forming the bottle into a container shape with less irregularities and less bends, resulting in a high freedom of design of the container shape. The method of the present invention is applicable to filling of various multilayer bottles having an excellent gas-barrier property. Thus, the present invention is largely valuable from industrial viewpoints.

The invention claimed is:

1. A method for filling a multilayer bottle with a material to be stored therein, comprising:
    filling said multilayer bottle with said material,
    wherein said multilayer bottle comprises outermost and innermost layers and at least one barrier layer interposed between the outermost and innermost layers, wherein the outermost and innermost layers are made mainly of a thermoplastic polyester resin obtained by polymerizing a dicarboxylic acid component containing 80 mol % or more of terephthalic acid with a diol component containing 80 mol % or more of ethylene glycol; and the barrier layer satisfies the following conditions (1) and (2) immediately before filling the multilayer bottle:

$$50° C. \leq Tg \leq 100° C. \quad (1)$$

$$Wb \leq 1\% \text{ by weight} \quad (2)$$

wherein Tg represents a glass transition point of the barrier layer; and Wb represents a water content of the barrier layer as measured by a Carl-Fisher method at 230° C. for 30 min.

2. The method according to claim 1, wherein Wb is from 0.01 to 1% by weight.

3. The method according to claim 1, wherein the multilayer bottle is produced by subjecting a multilayer preform to blow molding by a hot parison method or a cold parison method.

4. The method according to claim 3, wherein the multilayer bottle is heat-set within a blow mold.

5. The method according to claim 3, wherein the barrier layer formed in the multilayer preform has a water content of 1% by weight or less.

6. The method according to claim 3, wherein the barrier layer formed in the multilayer preform has a water content of from 0.005 to 1% by weight.

7. The method according to claim 3, wherein the multilayer preform, from which said multilayer bottle is produced, is preserved, prior to producing the multilayer bottle therefrom, in a bag made of a film having a water vapor permeability of 20 g/m²·day or less as measured according to JIS K7129, and then is subjected to blow molding to obtain the multilayer bottle.

8. The method according to claim 7, wherein the multilayer preform is preserved in the presence of a drying agent.

9. The method according to claim 3, wherein the multilayer bottle is filled with the material to be stored therein within 7 days after producing the multilayer bottle by blow molding.

10. The method according to claim 3, wherein the multilayer bottle produced by blow molding is filled with the material to be stored therein by an in-line method.

11. The method according to claim 1, wherein the multilayer bottle is filled with the material to be stored therein by a hot filling method.

12. The method according to claim 1, wherein the multilayer bottle is filled with the material to be stored therein by an aseptic (sterile) filling method.

13. The method according to claim 1, wherein the material to be stored in the multilayer bottle is beer or a carbonated beverage.

14. The method according to claim 1, wherein the barrier layer is made mainly of a polyamide produced by polycondensing a diamine component containing 70 mol % or more of m-xylylenediamine with a dicarboxylic acid component containing 50 mol % or more of an α,ω-linear aliphatic dicarboxylic acid having 4 to 20 carbon atoms.

15. The method according to claim 3, wherein the multilayer bottle is produced by subjecting the multilayer preform to biaxial stretch blow molding by a method satisfying the following conditions (I) to (IV):
    (I) heating a surface of the multilayer preform to a temperature of from 90 to 110° C.;
    (II) blowing a high-pressure air into the heated multilayer preform while stretching the multilayer preform in a longitudinal direction thereof within a mold and varying a pressure of the high-pressure air blown thereinto in multiple stages;
    (III) controlling the pressure of the high-pressure air at a first stage of the multi-stage blowing (primary blow pressure) to from 0.5 to 2.0 MPa; and
    (IV) controlling the pressure of the high-pressure air at a final stage of the multi-stage blowing (secondary blow pressure) to from 2 to 4 MPa.

16. A filled multilayer bottle which has been filled with a material by the method as defined in claim 1.

17. The method according to claim 1, wherein, when filling the multilayer bottle with said material, said barrier layer is controlled to satisfy said conditions (1) and (2).

18. The method according to claim 1, wherein an oxygen transmission rate of the barrier layer in a barrel portion of the multilayer bottle is at most 0.2 cc·mm/(m²·day·atm) as measured at a temperature of 23° C. and a relative humidity of 60%.

19. The method according to claim 1, wherein the condition (1) is 75° C. $\leq Tg \leq$ 85° C.

20. The method according to claim 1, wherein a crystallization temperature and quantity of heat of crystallization of the barrier layer, immediately before filling the multilayer bottle, is 80° to 170° C. and 2 to 20 J/g respectively.

* * * * *